United States Patent [19]

Northedge

[11] Patent Number: 5,548,990
[45] Date of Patent: Aug. 27, 1996

[54] METHODS AND SYSTEMS FOR CALIBRATING FLOW METERS

[76] Inventor: Ronald Northedge, Maison Du Sud, Val De La Mare, St. Peter, Jersey, Channel Islands

[21] Appl. No.: 424,233

[22] Filed: Apr. 19, 1995

Related U.S. Application Data

[63] Continuation of Ser. No. 101,414, Aug. 3, 1993, abandoned.

[30] Foreign Application Priority Data

Jul. 15, 1993 [GB] United Kingdom .................... 9314701

[51] Int. Cl.$^6$ .................................................. G01F 25/00
[52] U.S. Cl. ................................................................ 73/3
[58] Field of Search .................................................... 73/3

[56] References Cited

U.S. PATENT DOCUMENTS

| | | | |
|---|---|---|---|
| 2,851,882 | 9/1958 | Nottinghom, Jr. .............................. | 73/3 |
| 2,958,218 | 11/1960 | Hill ............................................... | 73/3 |
| 3,138,013 | 6/1964 | Smith ............................................ | 73/3 |
| 3,457,768 | 7/1969 | Jasek ............................................. | 73/3 |
| 3,469,442 | 9/1969 | Bruckner ................................... | 73/3 X |
| 3,711,689 | 1/1973 | Park ........................................ | 73/3 X |
| 3,958,443 | 5/1976 | Berrettini ...................................... | 73/3 |
| 4,658,634 | 4/1987 | Killough et al. ............................... | 73/3 |
| 4,945,754 | 8/1990 | Wissman, Jr. et al. ......................... | 73/3 |
| 4,959,990 | 10/1990 | Morris ....................................... | 73/3 X |
| 5,000,041 | 3/1991 | Miyamsto et al. .................... | 73/861.77 |
| 5,072,416 | 12/1991 | Francisco, Jr. et al. ................ | 73/1 HX |
| 5,321,992 | 6/1994 | Mudd et al. .............................. | 73/3 X |
| 5,363,689 | 11/1994 | Hoffmann et al. ............................ | 73/3 |

FOREIGN PATENT DOCUMENTS

| | | | |
|---|---|---|---|
| 1805605 | 5/1970 | Germany ..................................... | 73/3 |
| 112528 | 8/1980 | Japan ........................................... | 73/3 |
| 153215 | 11/1981 | Japan ........................................... | 73/3 |
| 28627 | 2/1983 | Japan ........................................... | 73/3 |
| 709071 | 5/1954 | United Kingdom ......................... | 73/3 |
| 2195448 | 4/1988 | United Kingdom ......................... | 73/3 |

OTHER PUBLICATIONS

*Instruments and Control Systems*, "Automatic Flowmeter Calibration", vol. 33, pp. 1537–1538; Sep. 1960; H. A. Lent; in 73/3.

*Conference Proceedings of the 23rd Annual Conference on Engineering in Medicine and Biology*; p. 271; "Calibration of C W and Pulse Doppler Flowmeters" Nov. 15–19, 1970; Francis D. McLeod, Jr.; in 73/3.

*Indian Journal of Technology*; vol. 12, No. 3, in 73/3 pp. 115–119, Mar. 1974 "High Pressure Tests on Constant Cross-Section Variable Area Flowmeter"; V. K. Chithambaran et al.

*Primary Examiner*—Thomas P. Noland
*Attorney, Agent, or Firm*—Synnestvedt & Lechner

[57] ABSTRACT

A method for in situ calibration of a flow meter under test installed in a pipe involves positioning a pre-calibrated insertion meter within the bore of the pipe in series with meter and using the output from the insertion meter to calibrate the meter. A calibration system is also described.

2 Claims, 2 Drawing Sheets

METHODS AND SYSTEMS FOR CALIBRATING FLOW METERS

This is a continuation of application Ser. No. 08/101,414 filed on Aug. 3, 1993 and now abandoned.

FIELD OF THE INVENTION

The invention relates to methods and systems for in situ calibration of flow meters, particularly, though not exclusively, water meters.

BACKGROUND OF THE INVENTION

Hitherto, it has been customary to calibrate a water meter in a test rig before the meter is installed in a pipe. However, regulations issued by the European Commission now require that a water meter be periodically calibrated in situ, that is, after the meter has been installed in a pipe.

In principle it would be possible to effect in situ calibration using a so-called meter prover, an apparatus conventionally used to calibrate flow meters in oil pipe lines.

Meter provers marketed by numerous companies comprise a by-pass loop which is coupled to the pipe-line downstream of the meter under test. Flow passes through the flow meter and is then diverted through the by-pass loop causing a piston or sphere to be displaced within a calibrated chamber. Flow of a known volume of fluid through the by-pass loop causes the piston or sphere to be displaced between a pair of detectors which are spaced apart from each other by a predetermined distance. By gating the outputs of the detectors, and measuring the time taken for the piston to be displaced therebetween, the flow rate through the meter prover, and so through the flow meter under test, can be accurately determined.

The meter prover gives an absolute measure of flow rate which is independent of parameters such as viscosity, density, temperature and pressure, and provides a very accurate calibration to within 0.02%.

Although meter provers are well-suited to calibrate flow meters in oil pipelines they do not offer a viable solution to the problems presented by in situ calibration of water meters.

A meter prover is a bulky apparatus; indeed, a meter prover suitable for calibrating a water meter installed in a 4" (10.24 cm) pipe would need to be transported on a heavy duty truck and is prohibitively expensive. Furthermore, in many situations it would be difficult, if not impossible, to manoeuvre the meter prover into close proximity with the water pipe.

SUMMARY OF THE INVENTION

According to one aspect of the invention there is provided a method for in situ calibration of a flow meter under test installed in a pipe comprising the steps of:

positioning a precalibrated insertion meter within the bore of the pipe in series with the flow meter under test, the insertion meter having an output bearing a predetermined relationship to flow rate in the pipe, and using said output of the insertion meter to calibrate the flow meter under test.

The method is particularly, through not exclusively, suitable for in situ calibration of water meters.

According to another aspect of the invention there is provided a system for in situ calibration of a flow meter under test installed in a pipe comprising a pre-calibrated insertion meter positioned within the bore of the pipe in series with the flow meter under test, the insertion meter having an output bearing a predetermined relationship to flow rate in the pipe, and processing means for using the output of the insertion meter to derive a calibration for the flow meter under test.

A system according to the invention is particularly, though not exclusively suitable for in situ calibration of a water meter.

BRIEF DESCRIPTION OF THE DRAWINGS

A method and system according to the invention are now described, by way of example only, with reference to the accompanying drawings, in which.

PREFERRED EMBODIMENTS OF THE INVENTION

Figure 1:
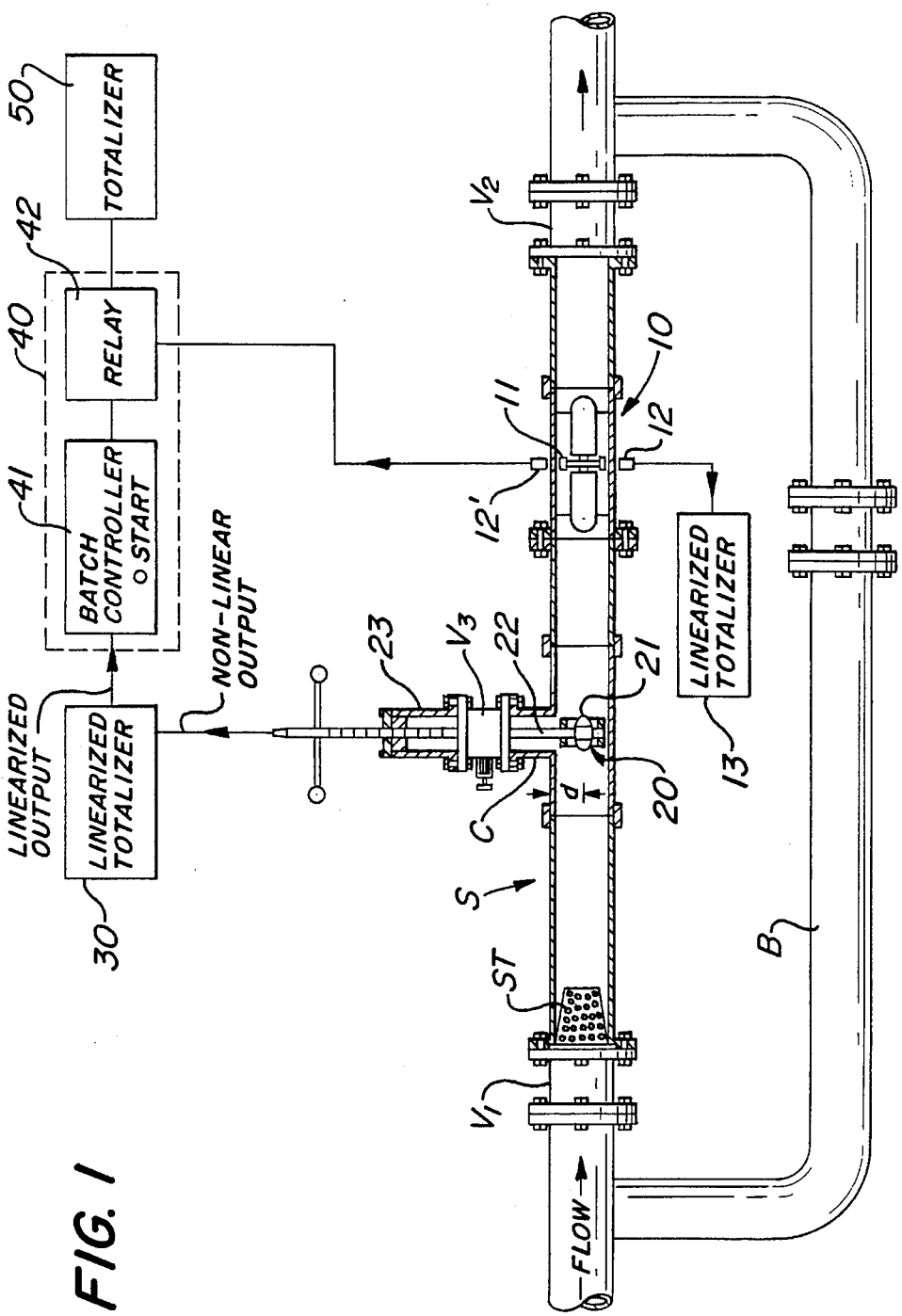
FIG. 1 a longitudinal sectional view of the system.

FIG. 1 of the drawings shows a section S of pipe (hereinafter referred to as the metering section) in which is installed a water meter 10 under test and a removable calibration meter. The calibration meter is in the form of an insertion meter 20 which is positioned within the bore of the pipe, in series with the water meter 10.

The metering section is fitted with an upstream wire strainer ST and is preferably made from a transparent material, such as a transparent plastics material, allowing an operator to inspect the meters 10,20 while they are running. A by-pass pipe B and upstream and downstream valves $V_1$, $V_2$ are also provided so that the metering section can be isolated from the main pipeline for servicing.

Water meter 10 is of a type producing an output frequency related to flow rate and, in this embodiment, is a turbine flow meter.

Referring to FIG. 1, the turbine flow meter comprises a free spinning rotor 11 and a detection coil 12 mounted in the pipe wall. Various components of the meter are made from a transparent plastics material to facilitate inspection, and the rotor 11 is made from magnetic stainless steel. As each vane of the rotor passes the coil due to flow of water along the pipe, it induces therein an electrical pulse. The output from coil 12 is in the form of a sine wave having a frequency which varies as a function of flow rate. Typically, at maximum flow rate the output frequency would be about 2 kHz giving very high resolution per unit volume of water flowing in the pipe.

Figure 2A:
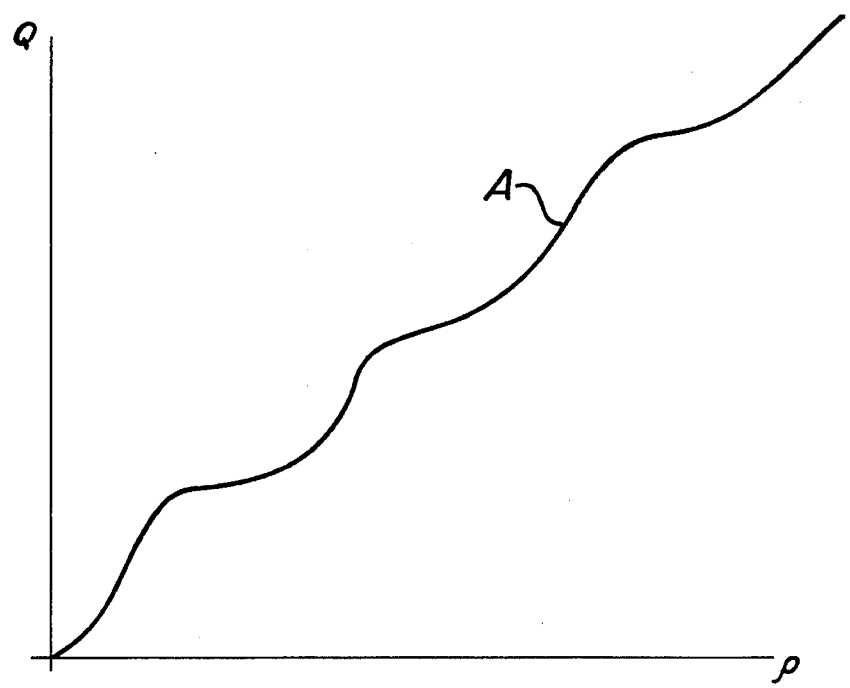
FIGS. 2a and 2b are diagrammatic illustrations of outputs of a flow meter under test and an insertion meter.

The turbine flow meter 10 does not have a linear output; that is to say, the output Q of the meter is non-linearly related to flow rate p, as shown diagrammatically by curve A in FIG. 2a. The quantity Q shown in FIG. 2 is the number of pulses (i.e. cycles) which are output by the meter in response to flow of a given volume of fluid.

The non-linearity in the output of meter 10 is mainly attributable to the dependency of Reynolds number on flow rate, which gives rise to a variation of flow profile across the pipe bore.

In view of this non-linearity, the output pulses from detector 12 are supplied to a sealed, tamper-proof, totaliser 13 which has a linearising facility; that is to say, a totaliser which has been programmed in advance to correct for the non-linearity in the output from detector 12 to give a true reading of flow rate (or of a related quantity). An example of a totaliser of this kind is the model TLRL 4B marketed by Euromatic Machine and Oil Co. (UK) Ltd.

As already explained, EC regulations require that a water meter be calibrated in situ; that is after the meter has been installed in a pipe. In accordance with the invention, such in situ calibration is carried out using a removable calibration meter which is inserted within the bore of the pipe in series with the water meter 10 under test. In this embodiment, the calibration meter is in the form of an insertion turbine meter 20 of the known kind. The insertion meter comprises a rotor 21 mounted at one end of a support rod 22 which is arranged to slide axially within a flanged mount 23. The metering section S has a transparent T-piece connector C to which mount 23 is removably coupled via an isolation valve $V_3$ which can be opened to enable rod 22 to be lowered. The rotor 21 is positioned at a preset insertion depth d within the bore of the pipe - for example, in the case of a 4" (10.16 cm) pipe the optimum insertion depth is 2" (5.08 cm), whereas for a 10" (25.4 cm) pipe, the optimum insertion depth is 3" (7.62 cm).

In order to provide a standard against which turbine flow meter 10 can be calibrated, it is necessary to precalibrate the insertion flow meter 20, and this is done in a test rig.

The test rig comprises a metering section which is identical to the actual metering section shown in FIG. 1, and the insertion meter 20 is calibrated using a meter prover of the kind described hereinbefore connected in series therewith.

An electronic totaliser 30 connected to the output of insertion meter 20 counts the number of pulses output by the meter while a known volume of water flows through the by-pass loop of the meter prover, and this procedure is repeated at different flow rates.

Figure 2B:
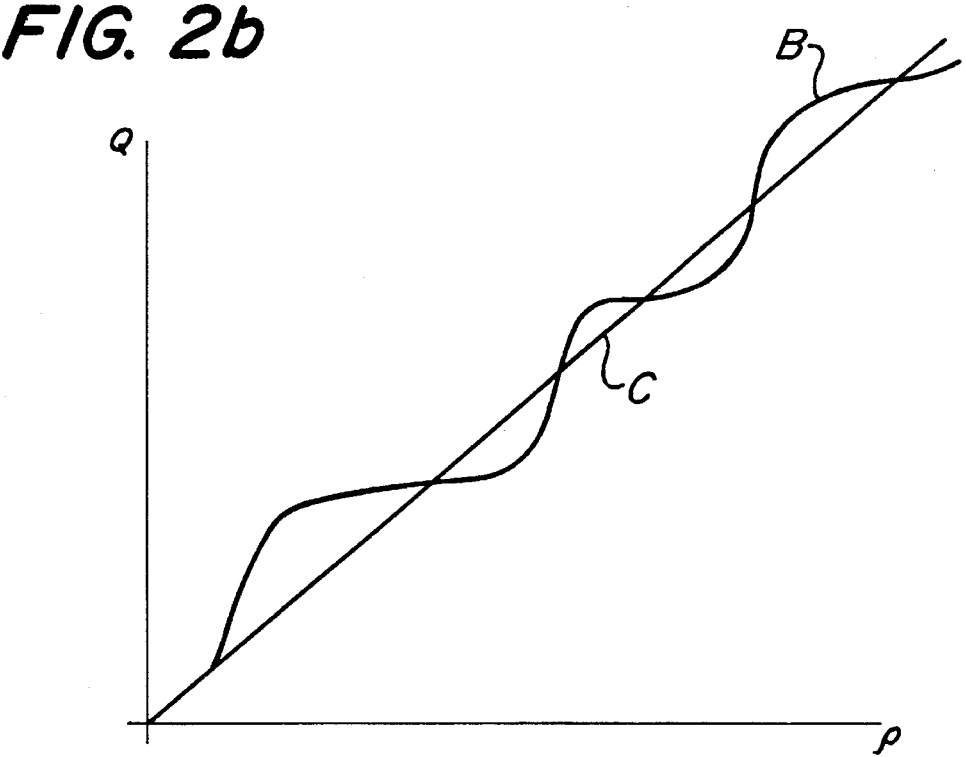

As shown diagrammatically by curve B in FIG. 2b, insertion meter 20 also has a non-linear output Q and, again, this non-linearity is mainly attributable to the dependency of Reynolds number on flow rate.

The electronic totaliser 30 also has a linearising facility. As part of the pre-calibration procedure a manually programmed computer uses the calibration measurements derived from the meter prover to linearise the output of totaliser 30 and so obtain the straight-line relationship represented diagramatically by curve C in FIG. 2b.

The linearised output of the insertion meter 20 can then be used to calibrate, in situ, the turbine flow meter under test.

The calibration is carried out using a processing circuit 40 including a batch controller 41 and a relay 42. Initially, a linearised output from insertion meter 20 is stored in the batch controller 41 as the number of pulses (linearised in totaliser 30) that are output by the meter when a unit volume of water (1 m³,say) flows along the pipe.

Once this value has been entered into the batch controller 41, the linearised totaliser 30 connected to the output of insertion meter 20 and a further non-linearised totaliser 50 connected via relay 42 to the output of a second detector 12' of flow meter 10 are simultaneously set to count pulses output by the respective meters.

The batch controller 41 compares the instantaneous (linearised) count in totaliser 30 with the pre-stored value and when the compared values are equal (indicating that the unit volume of water has passed along the pipe) relay 42 is triggered inhibiting the count in totaliser 50.

The entire procedure is then repeated for different rates of flow.

The respective total attained by totaliser 50 at each flow rate represents the number of pulses output by flow meter 10 in response to flow of the same unit volume of water along the pipe. These totals provide a measure of the non-linear relationship between the output of meter 10 and flow rate, and can be used to check, and if necessary correct, the calibration of totaliser 13.

By this means, the output from flow meter 10 is made directly proportional to flow rate and can be calibrated to an accuracy of about %0.5%.

It will be appreciated that although the invention has been described in relation to in situ calibration of water meters, the invention can also be used for in situ calibration of flow meters other than water meters, for example gas meters.

I claim:

1. A system for in situ calibration of a flow meter under test installed in a pipe comprising:

a pre-calibrated insertion meter positioned within the bore of the pipe in series with the flow meter under test, the insertion meter having an output bearing a predetermined relationship to flow rate in the pipe;

a linearized totalizer for linearizing the output of the insertion meter;

a further totalizer for totalizing the output of the flow meter under test, and processing means for using the output of the insertion meter to derive a calibration for the flow meter under test, said processing means comprising control means for storing a reference total output by the linearized totalizer in response to flow of a given volume of fluid along the pipe and for comparing the instantaneous total output by the linearized totalizer with the reference total, and means for inhibiting the further totalizer when the instantaneous total and the reference total are the same.

2. A system as claimed in claim 1 where said control means is a batch controller and the means for inhibiting the further totalizer is a relay.

* * * * *